J. ERDÉLYI.
SPRING WHEEL.
APPLICATION FILED APR. 26, 1917.
1,271,686.
Patented July 9, 1918.
2 SHEETS—SHEET 2.
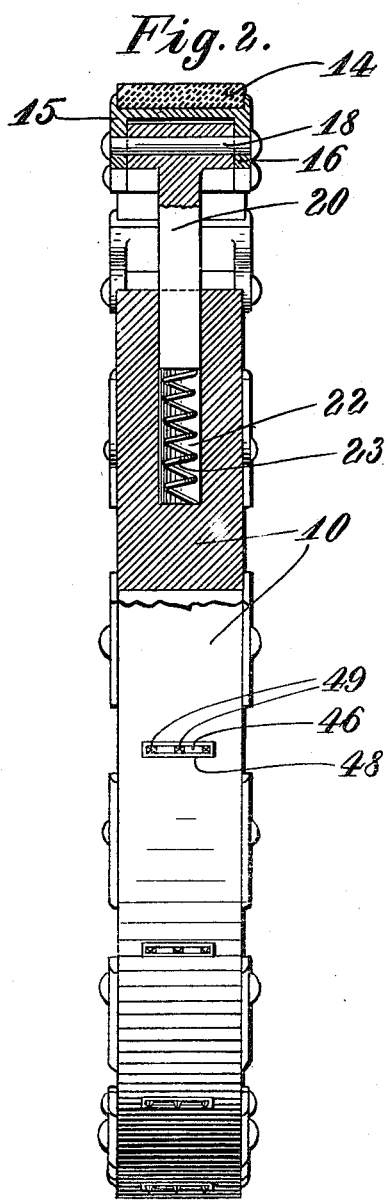
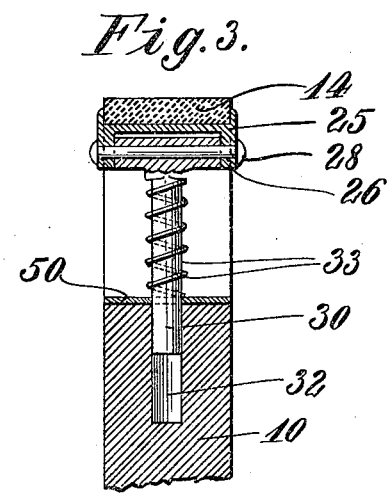
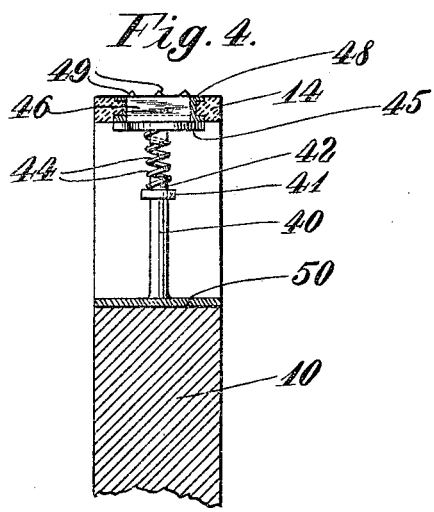
Inventor
John Erdélyi.
By his Attorney
Oscar Geier

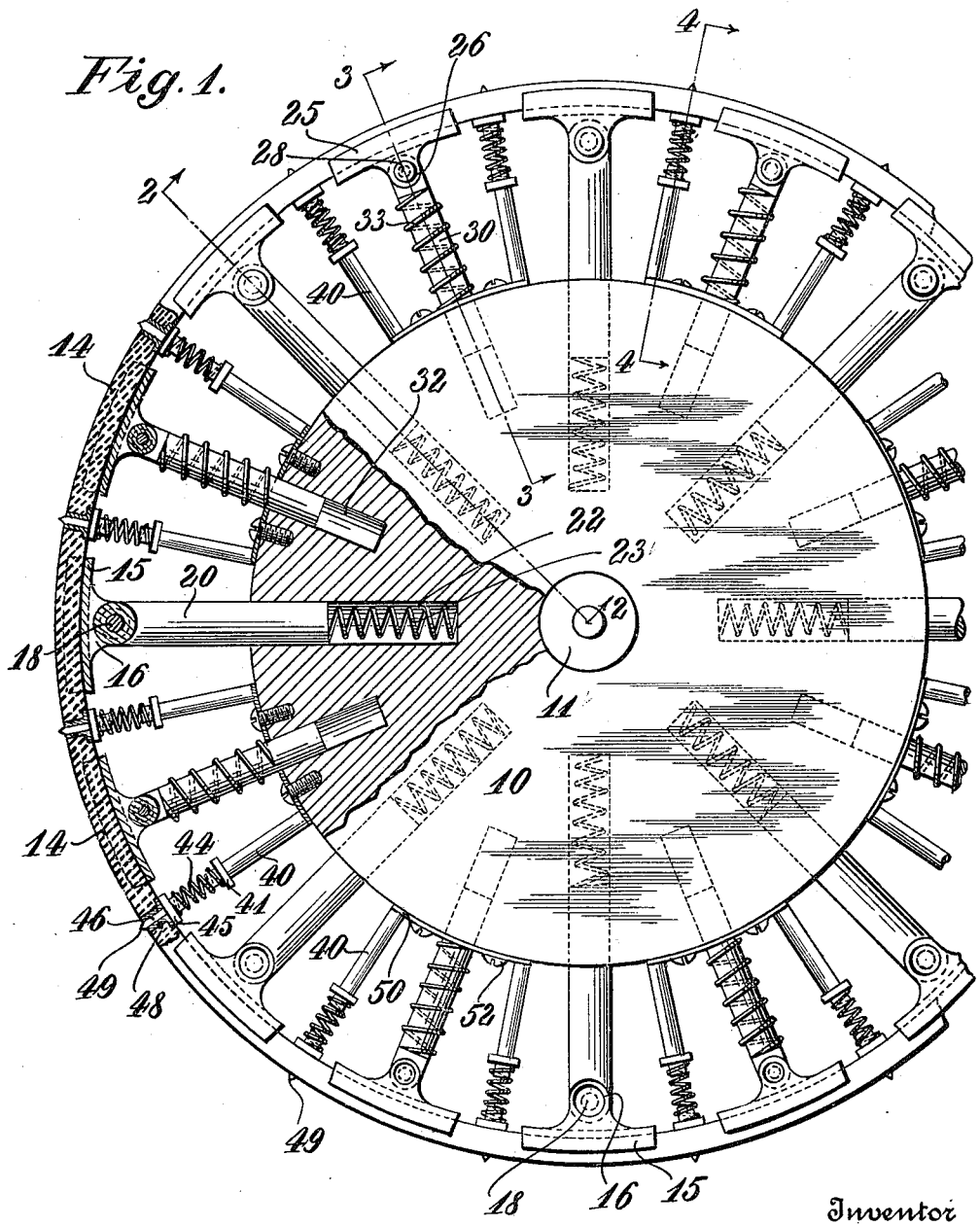

UNITED STATES PATENT OFFICE.

JOHN ERDÉLYI, OF RAYLAND, OHIO.

SPRING-WHEEL.

1,271,686.　　　　　　Specification of Letters Patent.　　　Patented July 9, 1918.

Application filed April 26, 1917. Serial No. 164,705.

*To all whom it may concern:*

Be it known that I, JOHN ERDÉLYI, a subject of the King of Hungary, resident of Rayland, county of Jefferson, and State of Ohio, have invented certain new and useful Improvements in Spring-Wheels, of which the following is a specification.

This invention relates to improvements in vehicle wheels in which the tread element is resiliently engaged with the center or rigid portion of the wheel in such manner that the same will permit of material deflection under pressure as applied by the axle and return to its normal condition upon the removal of such pressure.

A further object is to provide a wheel having novel and practical structural elements, the same being relatively few and simple in their construction.

These and other like objects are attained by the novel design, construction and combination of parts hereafter described and shown in the accompanying drawings, forming a material part of this disclosure, and in which:—

Figure 1 is a partial side elevational view of a wheel made in accordance with the invention, parts being broken away to disclose the construction.

Fig. 2 is a partial edge view and transverse section of the same, the section being taken on line 2—2 of Fig. 1.

Fig. 3 is a fragmental sectional view taken on line 3—3 of Fig. 1, and

Fig. 4 is a sectional view taken on line 4—4 of Fig. 1.

The wheel is comprised of a central, annular, rigid disk 10 having any preferred form of hub 11, and of integral solid construction.

Circumjacently spaced relatively to the disk 10 is the tread 14 held by a plurality of shoes 15, having arcuate channeled recesses adapted to contain the tread and preventing it from lateral movement.

Formed with the shoes 15 are centrally disposed, inwardly projecting lugs 16 in which are pivoted, by means of pins 18, the spokes 20, the inner ends of which extend into openings 22 formed in the disk 10 and which are held in a normally extended position by the coiled compression springs 23, one end of which is seated within the hub and the other against the inner end of the spoke.

Interposed between the shoes 15 are similarly formed shoes 25, having ears 26, through which the pins 28 pass, engaging cylindrical rods 30, the inner ends of which are contained within openings 32 formed in the disk 10, the rods being surrounded by coiled compression springs 33, adapted to exert their pressure so as to maintain the tread in uniform outward position.

It will be noticed that the diameter of the bars 30 is less than that of the elements 20, which they resemble in appearance and construction.

In order to prevent skidding or side action of the tread and also to provide a grip upon the surface over which the wheel is caused to travel, there is disposed between the elements 20 and 30, other rods 40 having fixed collars 41 and terminating in extensions 42, encircled by coiled compression springs 44, the other ends of which abut against transversely elongated plates 45 which are formed with radial extensions 46, adapted to pass through bushings 48, inserted in the tread, and are formed with a plurality of sharp, conical projections 49 which project slightly beyond the otherwise uniform cylindrical outer surface of the tread 14.

The rods 40 are arranged in pairs, their lower ends being formed with a rigid plate 50, having an arcuate inner face adapted to be engaged with the periphery of the disk 10 by means of the screws 52 in such manner as to be rigidly held therewith, central openings being formed through the plates for the passage of the cylindrical rods 30. It will be seen that the shoes 25 are capable of sliding relatively to the rubber tread when the wheel is in actual use, and that it is the function of the elongated plates 45 to serve as stops so as to restrain the slidable movement of said shoes, in a manner readily understood.

From the foregoing, it will be seen that a practical, self-contained simple structure has been disclosed which effectually operates as a resilient wheel possessing unusual merits.

Having thus described my invention, what I claim as new, and desire to secure by Letters Patent, is:—

1. In a wheel, in combination, a disk, a series of tread-supporting elements yieldably carried by said disk, an endless rubber tread mounted upon said tread-supporting elements, and a plurality of members each consisting of an arcuate portion secured upon the periphery of said disk, a pair of rods formed integrally upon said arcuate portion, flanges formed upon said rods short of their free ends, said rubber tread being formed circumferentially with a series of openings, bushings fitting in said openings, elongated plates adapted to pass through the bushings in said tread and having sharp edges, said plates having stubs, and coiled springs surrounding the free ends of said rods and the stubs and pressing said plates against said tread.

2. In a resilient wheel, in combination, a disk, having a plurality of radial sockets, an annular rubber tread, rods telescoping in said sockets, heads formed upon said rods, a series of shoes pivotally mounted upon said heads and carrying said annular rubber tread, springs against which said rods move within said sockets, rods projecting from the periphery of said disk and having spring seats, said tread formed with a plurality of radial openings, elongated plates formed with radial extensions having sharp edges projecting through said openings, said elongated plates being formed with stubs, and springs connecting the seats of said last-named rods and the stubs and urging said plates against the inner periphery of said tread, said shoes slidably disposed relatively to said rubber tread and adapted to be restrained in slidable movement by said plates.

In testimony whereof I have affixed my signature.

JOHN ERDÉLYI.

Copies of this patent may be obtained for five cents each, by addressing the "Commissioner of Patents, Washington, D. C."